(12) United States Patent
Eldering et al.

(10) Patent No.: US 6,714,917 B1
(45) Date of Patent: *Mar. 30, 2004

(54) SUBSCRIBER IDENTIFICATION BASED ON ELECTRONIC PROGRAM GUIDE DATA

(75) Inventors: Charles A. Eldering, Doylestown, PA (US); Gregory C. Flickinger, Horsham, PA (US)

(73) Assignee: Expanse Networks, Inc., Pipersville, PA (US)

( * ) Notice: Subject to any disclaimer, the term of this patent is extended or adjusted under 35 U.S.C. 154(b) by 558 days.

This patent is subject to a terminal disclaimer.

(21) Appl. No.: 09/635,253

(22) Filed: Aug. 9, 2000

Related U.S. Application Data

(63) Continuation-in-part of application No. 09/452,893, filed on Dec. 2, 1999.
(60) Provisional application No. 60/110,770, filed on Dec. 3, 1998.

(51) Int. Cl.$^7$ .............................................. G06F 17/60
(52) U.S. Cl. ............................... 705/10; 705/1; 705/14; 725/14; 725/15; 725/19; 725/34; 725/35; 725/46
(58) Field of Search ............................... 705/1, 10, 14; 725/14, 15, 19, 34, 35, 46

(56) References Cited

U.S. PATENT DOCUMENTS

| | | | | |
|---|---|---|---|---|
| 4,258,386 A | | 3/1981 | Cheung ........................ 725/14 |
| 4,546,382 A | | 10/1985 | McKenna et al. .......... 600/347 |
| 4,779,198 A | | 10/1988 | Lurie ............................. 725/12 |
| 5,155,591 A | | 10/1992 | Wachob ....................... 725/35 |
| 5,223,924 A | | 6/1993 | Strubbe ........................ 725/46 |
| 5,465,308 A | * | 11/1995 | Hutcheson et al. ......... 382/159 |
| 5,848,396 A | | 12/1998 | Gerace ......................... 705/10 |
| 5,974,396 A | | 10/1999 | Anderson et al. ........... 705/10 |
| 5,977,964 A | * | 11/1999 | Williams et al. ............ 348/721 |
| 5,991,735 A | | 11/1999 | Gerace ......................... 705/10 |
| 6,285,983 B1 | * | 9/2001 | Jenkins ......................... 705/10 |
| 6,457,010 B1 | * | 9/2002 | Eldering et al. ............. 707/10 |

OTHER PUBLICATIONS

Product Literature, Aptex Software Inc., "SelectCast for Ad Servers", printed from the World Wide Web site http://www.aptex.com./products–selectcast–commerce.htm on Jun. 30, 1998; 4 pp.

Product Literature, Imgis Inc., "AdForce", printed from the World Wide Web site http:://www.starpt.com/core/ad Target.html on Jun. 30, 1998; 5pp.

IEEE Publication "A Framework for Targeting Banner Advertising on the Internet", by Gallagher, et al; Jan. 1997; 12 pp.

\* cited by examiner

*Primary Examiner*—Eric W. Stamber
*Assistant Examiner*—Raquel Alvarez
(74) *Attorney, Agent, or Firm*—Douglas J Ryder, Esq.; Ryder IP Law, PC

(57) ABSTRACT

A subscriber identification system is presented in which EPG related data including scrolling rates, paging rates, information screen viewing times, and manner and frequency of EPG activation are used to identify a subscriber from a group of subscribers. In one instance, the subscriber viewing data is recorded and a signal processing algorithm, such as a Fourier transform, is used to produce a processed version of the EPG related data. The processed version of the EPG related data can be correlated with stored common identifiers of subscriber profiles to determine which subscriber from the group is presently viewing the programming. A neural network or fuzzy logic can be used as the mechanism for identifying the subscriber from clusters of information, which are associated with individual subscribers.

29 Claims, 13 Drawing Sheets

IF PROB (GENDER = FEMALE) ≥ 0.7 AND PROB (CATEGORY=SOAP OPERA) ≥ 0.7

SET   GENDER = FEMALE

IF PROB (GENDER = MALE) ≥ 0.7 AND PROB (CATEGORY = SPORT) ≥ 0.7

SET   GENDER = MALE

| | | SESSION VALUE | |
|---|---|---|---|
| CATEGORY | CATEGORY 1<br>CATEGORY 2<br>⋮<br>CATEGORY K | 1<br>0<br>⋮<br>1 | ~ 301 |
| SUB-CATEGORY | SUB-CATEGORY 1<br>SUB-CATEGORY 2<br>⋮<br>SUB-CATEGORY L | 1<br>0<br>⋮<br>0 | ~ 303 |
| CONTENT | CONTENT 1<br>CONTENT 2<br>⋮<br>CONTENT P | 1<br>1<br>⋮<br>0 | ~ 305 |
| PROGRAM TITLE | PROGRAM TITLE 1<br>PROGRAM TITLE 2<br>⋮<br>PROGRAM TITLE Q | 1<br>0<br>⋮<br>0 | ~ 307 |
| SCROLLING RATES | 1ST SECOND<br>2ND SECOND<br>⋮<br>10TH SECOND | 2<br>2<br>⋮<br>0 | ~ 309 |
| PAGING RATES | 1ST SECOND<br>2ND SECOND<br>⋮<br>10TH SECOND | 1<br>1<br>⋮<br>1 | ~ 311 |

*FIG. 3A*

|  |  | SESSION VALUE |  |
|---|---|---|---|
| INFORMATION SCREEN VIEWING | 1ST SECOND | 0 | ~313 |
| | 2ND SECOND | 0 | |
| | ⋮ | ⋮ | |
| | 10TH SECOND | 1 | |
| MANNER OF EPG ACTIVATION | FULL SCREEN | 0 | ~315 |
| | WINDOW SCREEN | 1 | |
| FREQUENCY OF EPG ACTIVATION | 1ST MINUTE | 2 | ~317 |
| | 2ND MINUTE | 2 | |
| | ⋮ | ⋮ | |
| | 10TH MINUTE | 0 | |

*FIG. 3B*

IF PROB (GENDER = FEMALE) ≥ 0.7 AND PROB (CATEGORY=SOAP OPERA) ≥ 0.7
    SET   GENDER = FEMALE

IF PROB (GENDER = MALE) ≥ 0.7 AND PROB (CATEGORY = SPORT) ≥ 0.7
    SET   GENDER = MALE

*FIG. 8*

RECORD [SEQUENCE]; /* STORE SUBSCRIBER SELECTION DATA I.E.
                    SCROLLING, PAGING, INFORMATION SCREEN
                    VIEWING, AND MANNER/FRTEQUENCY OF EPG
                    ACTIVATION

F_T_SEQ= FOURIER [SEQUENCE]; /* COMPUTE FOURIER TRANSFORM OF
                                SEQUENCE */

FOR I = 1 TO N
    BEGIN
        COR_VAL(I)= CORRELATE [F_T_SEQ, COM_IDENT (I)];
            /* COM_IDENT (I) REPRESENTS THE COMMON
               IDENTIFIER OF THE $I^{TH}$ SUBSCRIBER PROFILE */

STORE COR_VAL (I);
    END

SUB_ID = ARG $\left\{ \underset{I}{MAX} (COR\_VAL (I)) \right\}$;

/* SUBSCRIBER W/ MAX CORRELATION VALUE W/ F_T_SEQ IS
       IDENTIFIED */

FIG. 10

SUBSCRIBER IDENTIFICATION BASED ON ELECTRONIC PROGRAM GUIDE DATA

This application is a Continuation-In-Part (CIP) of U.S. application Ser. No. 09/452,893 filed on Dec. 2, 1999, which claims the priority of provisional application No. 60/110,770 filed on Dec. 3, 1998, application Ser. No. 09/452,893 is herein incorporated by reference, but are not admitted to be prior art.

BACKGROUND OF THE INVENTION

The ability to direct specific advertisements to subscribers of entertainment programming and subscribers of on-line services is dependent on identifying their product preferences and demographics. A number of techniques are being developed to identify subscriber characteristics, as discussed in co-pending U.S. application Ser. No. 09/205,653, entitled "Client-Server Based Subscriber Characterization System".

Even when subscriber characterizations can be performed, it is often the case that the television/set-top or personal computer that is receiving the programming is used by several members of a household. Within the television/set-top equipment or personal computer there exist an Electronic Program Guide (EPG). The EPG is typically a navigational tool, which contains source related information including but not limited to the programming category, program description, rating, actors, and duration. The structure and content of EPG data is described in detail in U.S. Pat. No. 5,596,373 assigned to Sony Corporation and Sony Electronics, which is herein incorporated by reference. Given that these members of the household can have very different demographic characteristics and product preferences, it is important to be able to identify which subscriber is utilizing the EPG system. Additionally, it would be useful to be able to utilize previous characterizations of a subscriber, once that subscriber is identified from a group of subscribers.

For the foregoing reasons, there is a need for a subscriber identification system, which can identify a subscriber in a household or business and retrieve previous characterizations based upon their EPG activities.

SUMMARY OF THE INVENTION

The present invention encompasses a system for identifying a particular subscriber from a household or business.

The present invention encompasses a method and apparatus for identifying a subscriber based on their particular Electronic Program Guide (EPG) activities. These activities may include scrolling, paging, and information screen viewing habits as well as but not limited to their method and frequency of EPG activation. As a subscriber activates the EPG or scrolls or pages through, and views program and channel information, the sequence of actions performed and the programs selected are recorded and analyzed. The actual set up of the EPG and the manner of how EPG was activated, i.e., whether a remote control device or a button on the set-top was used may also be analyzed. Additionally, the rate of scrolling, paging and screen viewing may also be analyzed and recorded, i.e., an adult in the household may scroll through the information faster than a child, thus, by analyzing the scrolling rate it may be determined whether the viewer is an adult or a child. In one embodiment, the EPG related information is computed for a predetermined time (a session), and the collected information is used to form a session data vector which can be used by a neural network to identify the subscriber based on recognition of the related subscriber characteristics based on previous sessions. These subscriber characteristics may then be used to target advertising/entertaining programming at different subscribers.

In an alternate embodiment, the EPG related actions that the subscriber is executing, or measurements associated with the action, are mined to produce statistical information regarding the program selection including the demographics of the target audience and the type of actions being executed. This program related information is also included in the session data vector and is used to identify the subscriber.

In one embodiment, the EPG related data is processed using a Fourier transform to obtain a signature for each session profile wherein the session profile comprises a probabilistic determination of the subscriber demographic data and the program characteristics. In this embodiment, a classification system is used to cluster the session profiles wherein the classification system groups the session profiles having highly correlated signatures and wherein a group of session profiles is associated with a common identifier derived from the signatures.

In another embodiment, the system identifies a subscriber by correlating a processed version of the EPG related data with the common identifiers of the subscriber profiles stored in the system.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 3A and 3B illustrate an example of a session data vector;

FIG. 8 illustrates examples of fuzzy logic rules;

FIG. 10 illustrates a pseudo-code for implementing the identification process of the present invention.

DETAILED DESCRIPTION OF THE PREFERRED EMBODIMENT

Figure 1:
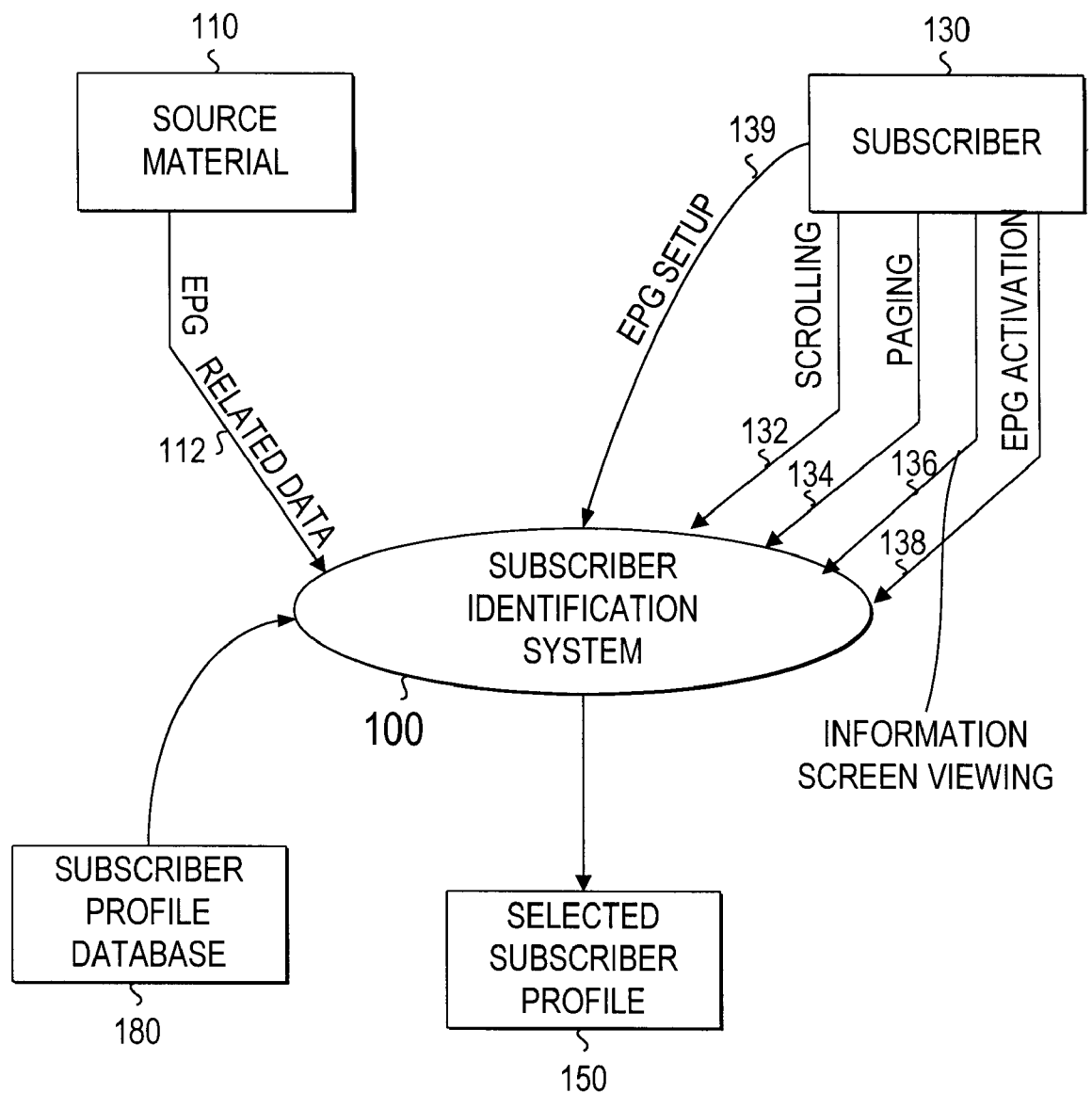
FIG. 1 illustrates a context diagram of the subscriber identification system.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the apparatus of the present invention is disclosed.

The present invention is directed at a method and apparatus for determining which subscriber in a household or business is activating and executing particular actions via the Electronic Program Guide (EPG).

FIG. 1 shows a context diagram of a subscriber identification system 100. The subscriber identification system 100 monitors the EPG related activities of a subscriber 130 with source material 110, and identifies the subscriber 130 by selecting the appropriate subscriber profile 150 from the set of subscriber profiles stored in the system. The selected subscriber profiles help in subscriber identification. The source material 110 is the actions that a subscriber 130 performs, or text associated with the source material. Source material 110 may be, but is not limited to the EPG related data 112 related in the actions of the subscriber 130. These actions may be, but are not limited to scrolling rates 132, paging rates 134, information screen viewing times 136 and the manner and frequency of EPG activation 138, wherein the scrolling rates refer to the rates at which a subscriber scrolls through the EPG information, the paging rates refer to the speeds at which the subscribers change the pages of the EPG guide, and the information screen viewing times refer to the time the subscribers spend on viewing information at each screen. In addition, EPG related data 112 may include setup data for the EPG, wherein the EPG setup involves setting up program references and selections in the EPG guide.

The subscriber identification system 100 monitors and analyzes scrolling speed, paging speed, information screen viewing time as well as the method and frequency of EPG activation, and based on the collected data, generates session characteristics which describe the EPG activities during that session.

It should be noted that the information collected about the EPG related activities, (i.e., information related to the scrolling speed, the paging speed, the information screen viewing times) are deterministic in nature. Each individual in the household has different EPG related habits, for example, a male member of the household may be a rapid browser (i.e., may scroll through the EPG screen quickly), wherein the female in the household may be a more avid reader (i.e., may spend more time reading information of each program description). In accordance with the principles of the present invention, such distinctions may be used to differentiate between subscribers. The actual identification of the subscriber occurs by selecting an appropriate subscriber profile 150 from a subscriber profile database 180. It should also be noted that a single EPG activity is not very reliable and is not deterministic in nature, but EPG related data collected over a predetermined period of time (i.e., a session) is deterministic and assists in subscriber identification.

Figure 2:
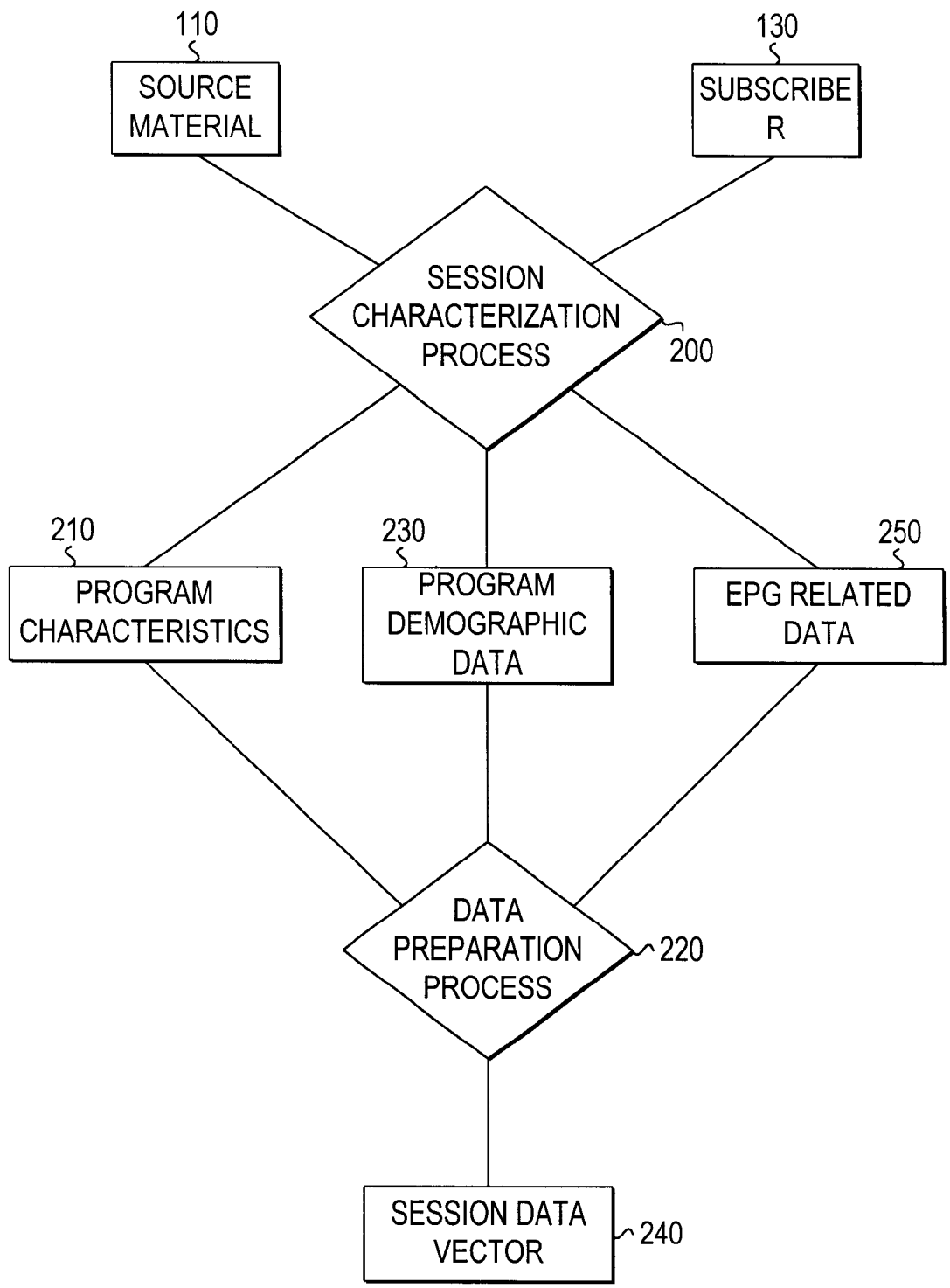
FIG. 2 illustrates an entity-relationship for the generation of a session data vector.

A session characterization process 200 is described in accordance with FIG. 2. A session data vector 240, which is derived in the session characterization process 200 is presented to a neural network, to identify the subscriber 130. Identifying the subscriber 130, in that instance, means determining the subscriber profile 150. The subscriber profile 150 contains probabilistic or deterministic measurements of an individual's characteristics including age, gender, and program and product preferences based upon EPG activities.

As illustrated in FIG. 2, a session data vector 240 is generated from the source material 110 and the activities of the subscriber 130. In a first step, the activities and the source material 110 are presented to the session characterization process 200. This process determines program characteristics 210, program demographic data 230 and EPG related data 250.

The program characteristics 210 consist of the program category, subcategory and content description. These characteristics are obtained by applying the method described in co-pending U.S. Application entitled "Subscriber Characterization System," previously referenced and incorporated herein.

The program demographic data 230 describes the demographics of the group at which the program is targeted. The demographic characteristics include but are not necessarily limited to age, gender and income.

The EPG related data 250 is obtained from the monitoring system and includes details of what actions the subscriber 130 has performed, and how it is determined (i.e., scrolling speed, paging speed, information screen viewing time, the manner and frequency of EPG activation, etc).

As illustrated in FIG. 2, the output of the session characterization process 200 is presented to a data preparation process 220. The data is processed by the data preparation process 220 to generate a session data vector 240 with components representing the program characteristics 210, the program demographic data 230 and the EPG related data 250.

An example of the session data vector 240 is illustrated in FIGS. 3A and 3B. The session data vector 240 in FIGS. 3A and 3B summarizes the viewing session of an exemplary subscriber. The components of the vector provide a temporal profile of the actions of that subscriber. As illustrated in FIGS. 3A and 3B, the session data vectors 240 may include category 301, subcategory 303, content 305, program title 307, scrolling rates 309, paging rates 311, information screen viewing times 313, manner of EPG activation 315, and frequency of EPG activation 317, etc. Each of the data vectors also have an associated session value that represents the numerical value of the data vector.

Figure 4:
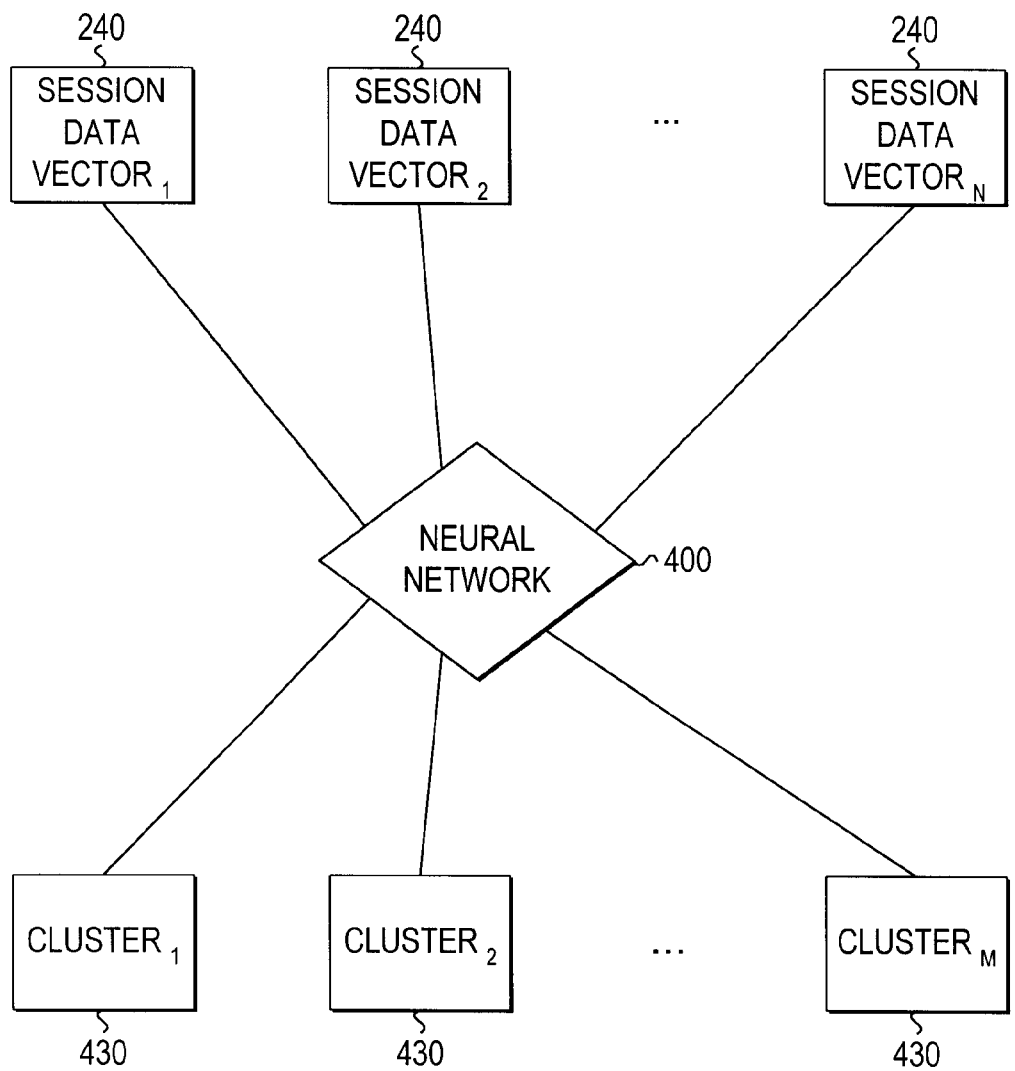
FIG. 4 illustrates, in entity relationship form, the learning process of the neural network.

FIG. 4 illustrates the learning process of a neural network 400, which, in a preferred embodiment, can be used to process session data vectors 240 to identify a subscriber. As illustrated in FIG. 4, the N session data vectors 240 are obtained from the data preparation process 220. Each session data vector 240 comprises characteristics specific to the subscriber. These characteristics can be contained-in any one of the vector components. As an example, a particular subscriber may frequently scroll at a slow rate, page at a fast rate, and activate the EPG only in full screen mode. Alternatively, a subscriber may always activate the partial screen mode of the EPG while the rest of the members of a household activate the full screen mode, thus permitting the identification of that subscriber by that trait. The time at which a subscriber watches programming may also be similar, so it is possible to identify that subscriber by time-of-day characteristics.

By grouping the session data vectors 240 such that all session data vectors with similar characteristics are grouped together, it is possible to identify the household members. As illustrated in FIG. 4, a cluster 430 of the session data vectors 240 is formed, which represents a particular member of that household.

In a preferred embodiment, a neural network 400 is used to perform the clustering operation. The neural network 400 can be trained to perform the subscriber identification based on the session data vector 240. In the training session, the N samples of the session data vectors 240 are separately presented to the neural network 400. The neural network 400 recognizes the inputs that have the same features and regroups them into the same cluster 430. During this process, the synaptic weights of the links between the nodes are adjusted until the network reaches its steady-state. The learning rule applied can be a competitive learning rule where each neuron represents a particular cluster 430, and is thus "fired" only if the input presents the features represented in that cluster 430. Other learning rules capable of classifying a set of inputs can also be utilized. At the end of this process, the M clusters 430 are formed, each representing a subscriber.

Figure 5:
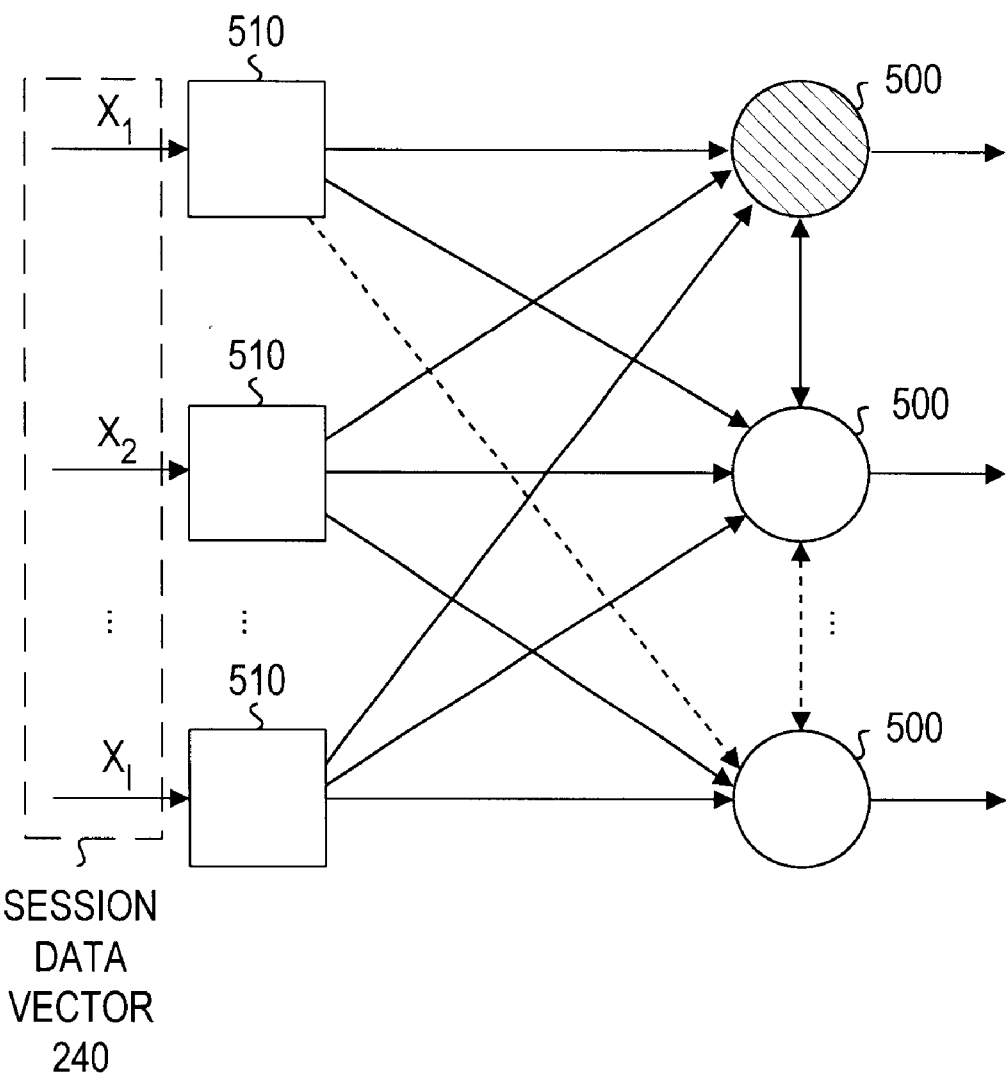
FIG. 5 illustrates competitive learning.

FIG. 5 illustrates an example of a competitive single-layer neural network. Such a neural network can be utilized to realize the neural network 400. In a preferred embodiment, a shaded neuron 500 is "fired" by a pattern. The input vector, in this instance a session data vector 240, is presented to the input nodes 510. The input is then recognized as being a member of the cluster 430 associated with the shaded neuron 500.

In one embodiment, the EPG related data 250, which includes the scrolling speed, the paging speed, the information screen viewing time and the manner and frequency of EPG activation are further processed to obtain a signature. The signature is representative of the interaction between the subscriber and the source material 110. In accordance with the principles of the present invention, it is determined that the subscribers have their own EPG activity habits, which translate into a pattern of selection data specific to each subscriber.

Figure 6A:
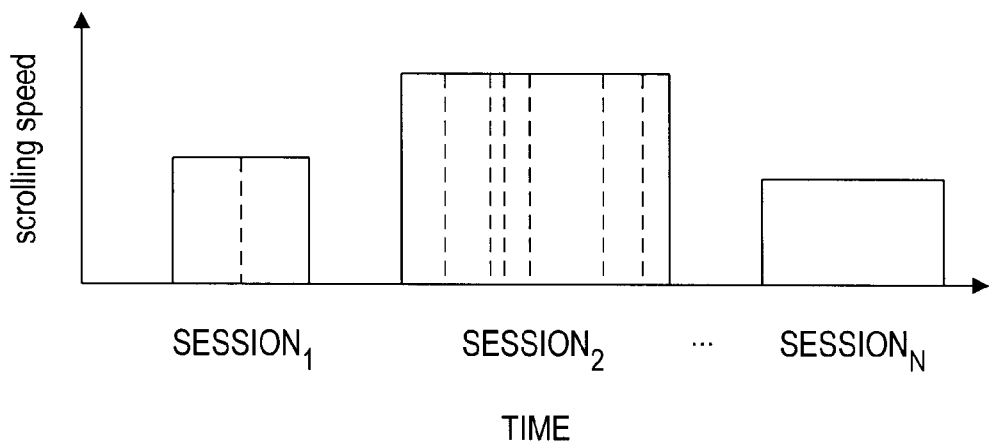
FIGS. 6A–6G illustrate a session profile.
Figure 6B:
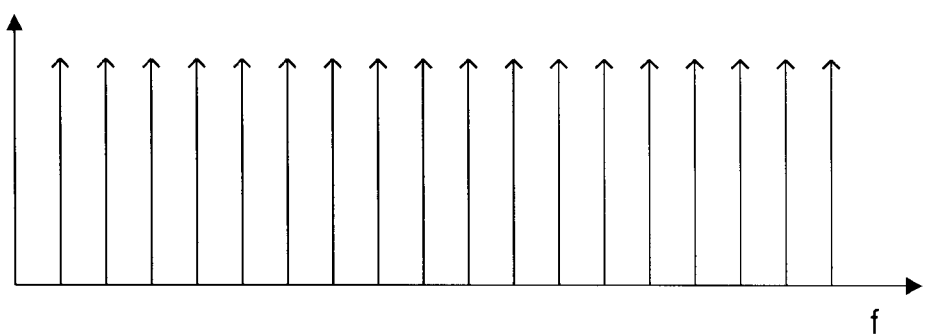

In a preferred embodiment, the signature is the Fourier transform of the signal representing the scrolling change rates and the paging change rates. The scrolling speed and the paging speed can be calculated from the scrolling and paging change rates. The scrolling change signal is shown in FIG. 6A, while the signature is illustrated in FIG. 6B. Those skilled in the art will recognize that the scrolling and paging change signal can be represented by a succession of window functions or rectangular pulses, thus by a mathematical expression.

The discrete spectrum shown in FIG. 6B can be obtained from the Digital Fourier Transform of the scrolling and paging change signal. Other methods for obtaining a signature from a signal are well known to those skilled in the art and include wavelet transform.

Figure 6C:
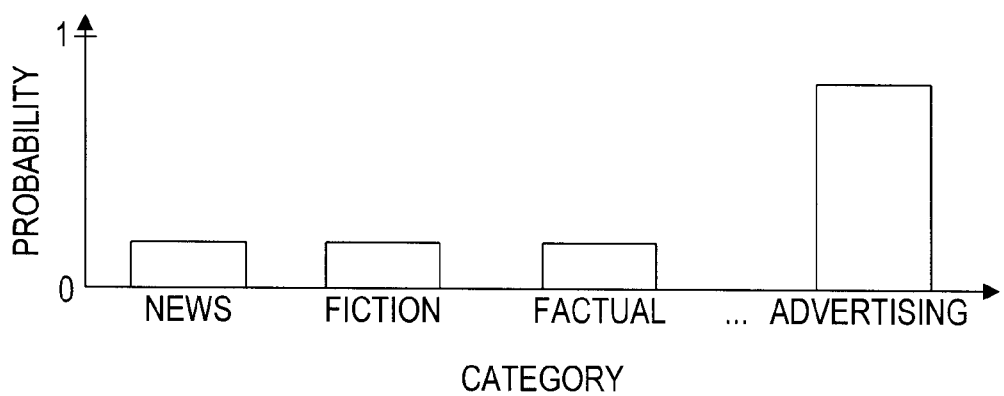
Figure 6D:
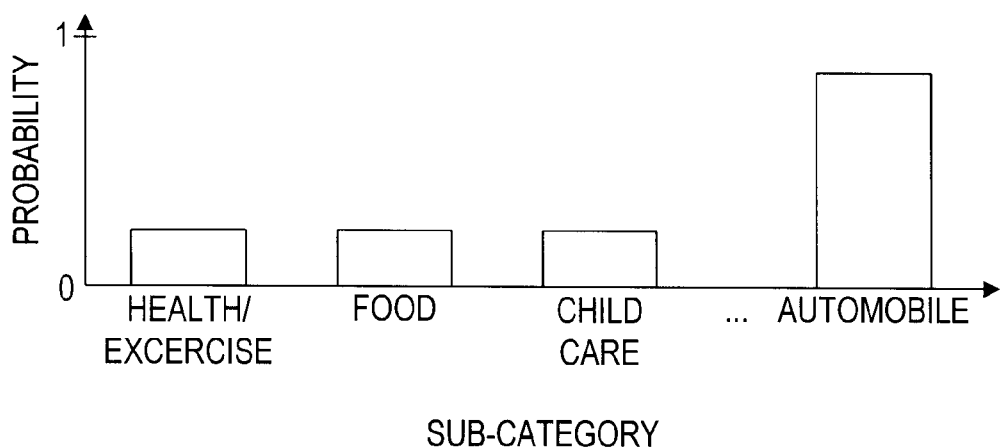
Figure 6E:
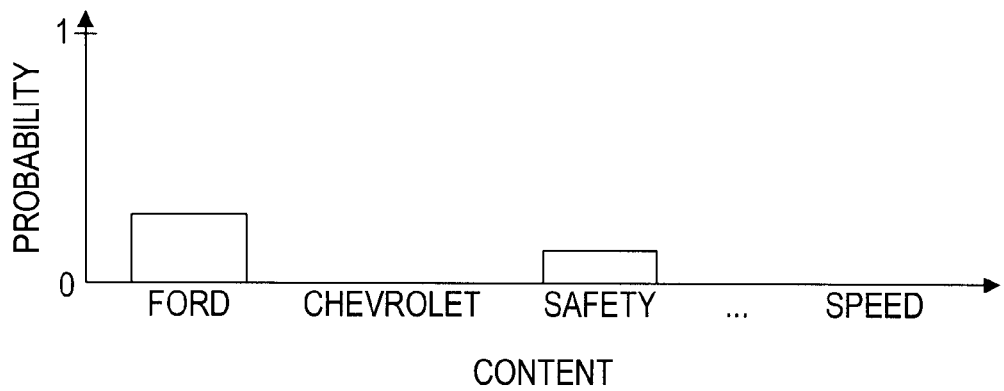

In this embodiment of the present invention, the signature is combined with the program demographic data 230 and the program characteristics 210 to form a session profile, which is identified by the signature signal. The program demographic data 230 and the program characteristics 210 are represented in FIGS. 6C through 6G. FIG. 6C represents the probabilistic values of the program category. FIGS. 6D and 6E represent the probabilistic values of the program sub-category and the program content, respectively.

Figure 6F:
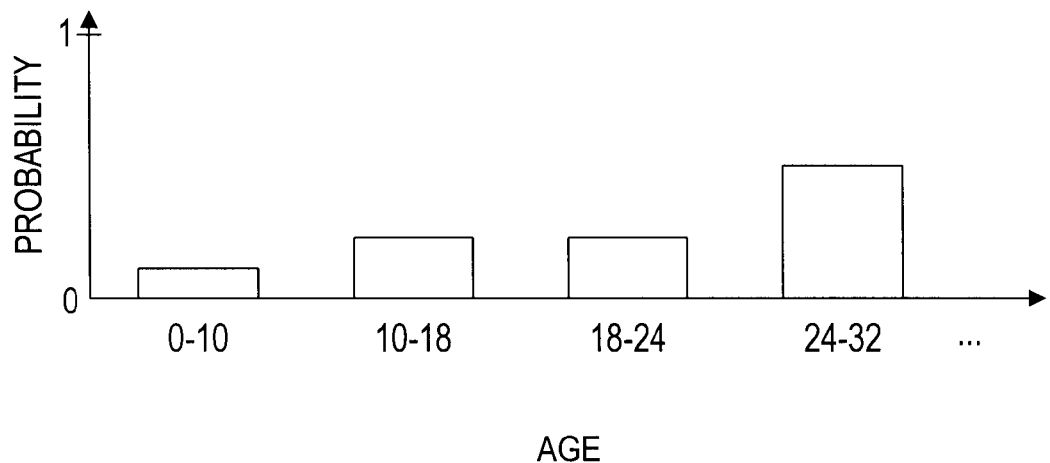
Figure 6G:
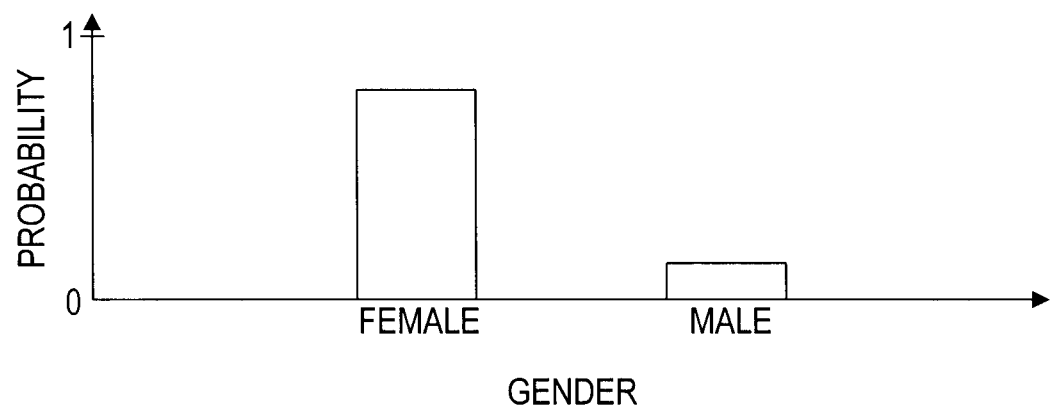

The program demographic data 230, which includes the probabilistic values of the age and the gender of the program recipients are illustrated in FIGS. 6F and 6G respectively.

Figure 7:
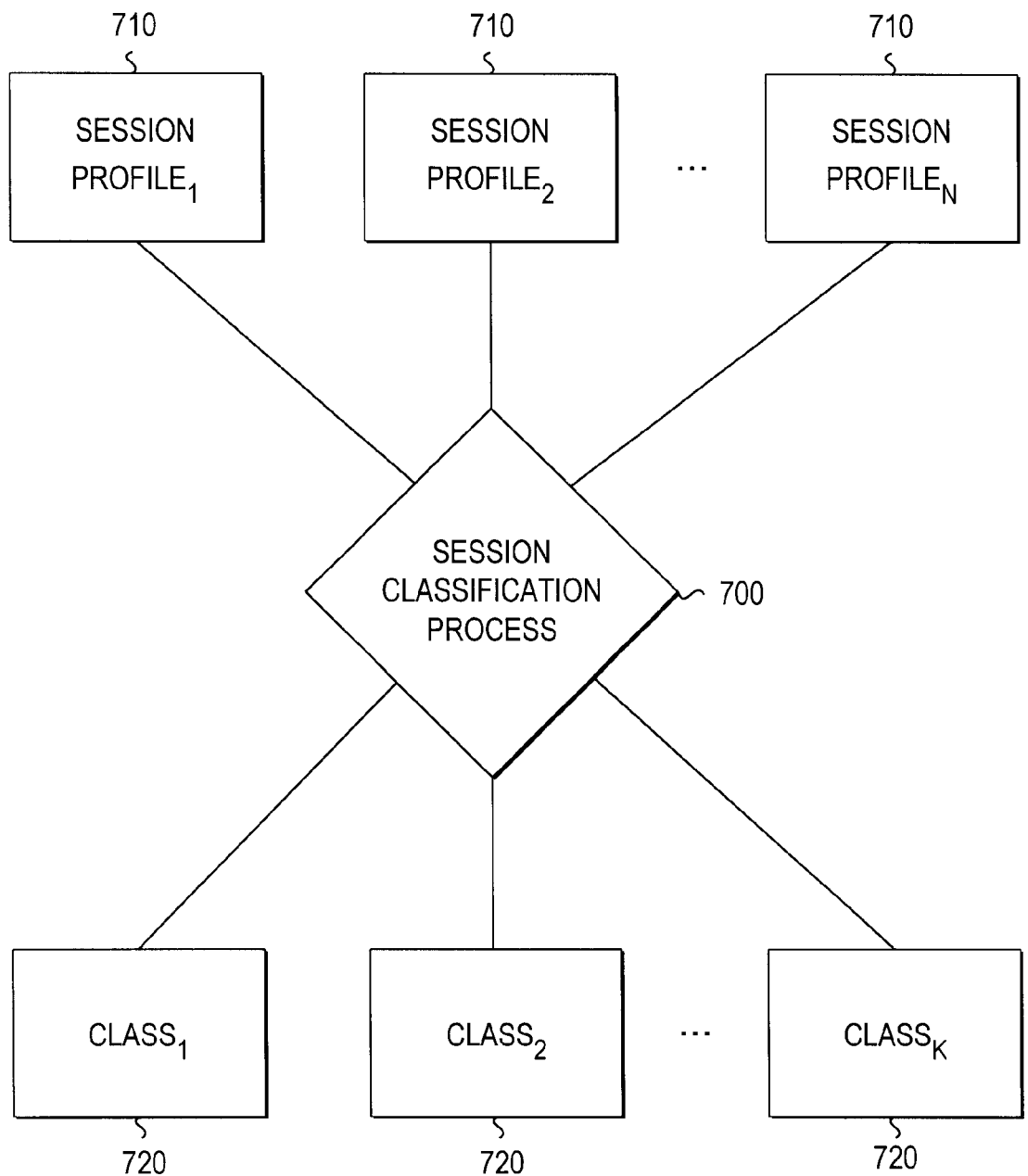
FIG. 7 illustrates entity relationships for classifying the session profiles.

FIG. 7 illustrates the entity relationship for classifying the session based on the signature signal. In this embodiment, the sessions having the same signature are grouped together. A session classification process 700 correlates the signature of different session profiles 710 and groups the sessions having highly correlated signatures into a same class 720. Other methods used in pattern classification can also be used to group the sessions into classes 720. In this embodiment, each class 720 is composed of a set of session profiles 710 with a common signature. The set of session profiles 710 within a class 720 can be converted into a subscriber profile 150 by averaging the program characteristics 210 and the program demographic data 230 of the session profiles 710 within the set. For example, the probabilistic values of the program category would be the average of all the probabilistic values of the program category within the set.

In one embodiment, a deterministic representation of the program demographic data 230 can be obtained by the use of fuzzy logic rules inside the common profile. Examples of rules that can be applied to the common profile are presented in FIG. 8. In this embodiment, the program demographic data are probabilistic values, which describe the likelihood of a subscriber to be part of a demographic group. As an example, the demographic data can contain a probability of 0.5 that a subscriber is a female and a probability of 0.5 that a subscriber is a male. By the use of the fuzzy logic rules such as those shown in FIG. 8, these probabilistic values can be combined with the probabilistic values related to the program characteristics 210 to infer a crisp value of the gender of a subscriber. The fuzzy logic rule is generally used to infer a crisp outcome from the fuzzy inputs, wherein the input values can take any possible values within an interval [a,b].

The subscriber profile obtained from a set of session profiles 710 within a class 720 is associated with a common identifier, which can be derived from the averaging of the signatures associated with the session profiles 710 within that class 720. Other methods for determining a common signature from a set of signatures can also be applied. In this instance, the common identifier is called the common signature.

In an alternate embodiment, the subscriber profile 150 is obtained through a subscriber-system interaction, which can include a learning program, wherein the subscriber is presented a series of questions or a series of viewing segments, and the answers or responses to the viewing segments are recorded to create the subscriber profile 150.

In another embodiment, the subscriber profile 150 is obtained from a third source, which may be a retailer or other data collector that is able to create a specific demographic profile for the subscriber.

In one embodiment, the subscriber profile 150 is associated with a Fourier transform representation of the predicted viewing habits of that subscriber which is created based on the demographic data and the viewing habits associated with subscribers having that demographic profile. As an example, the demonstrated correlation between the income and the scrolling frequency permits the generation of a subscriber profile 150 based on the knowledge of the subscriber's income. Using this methodology it is possible to create expected EPG activity habits, which form the basis for a common identifier for the subscriber profile 150.

Figure 9:
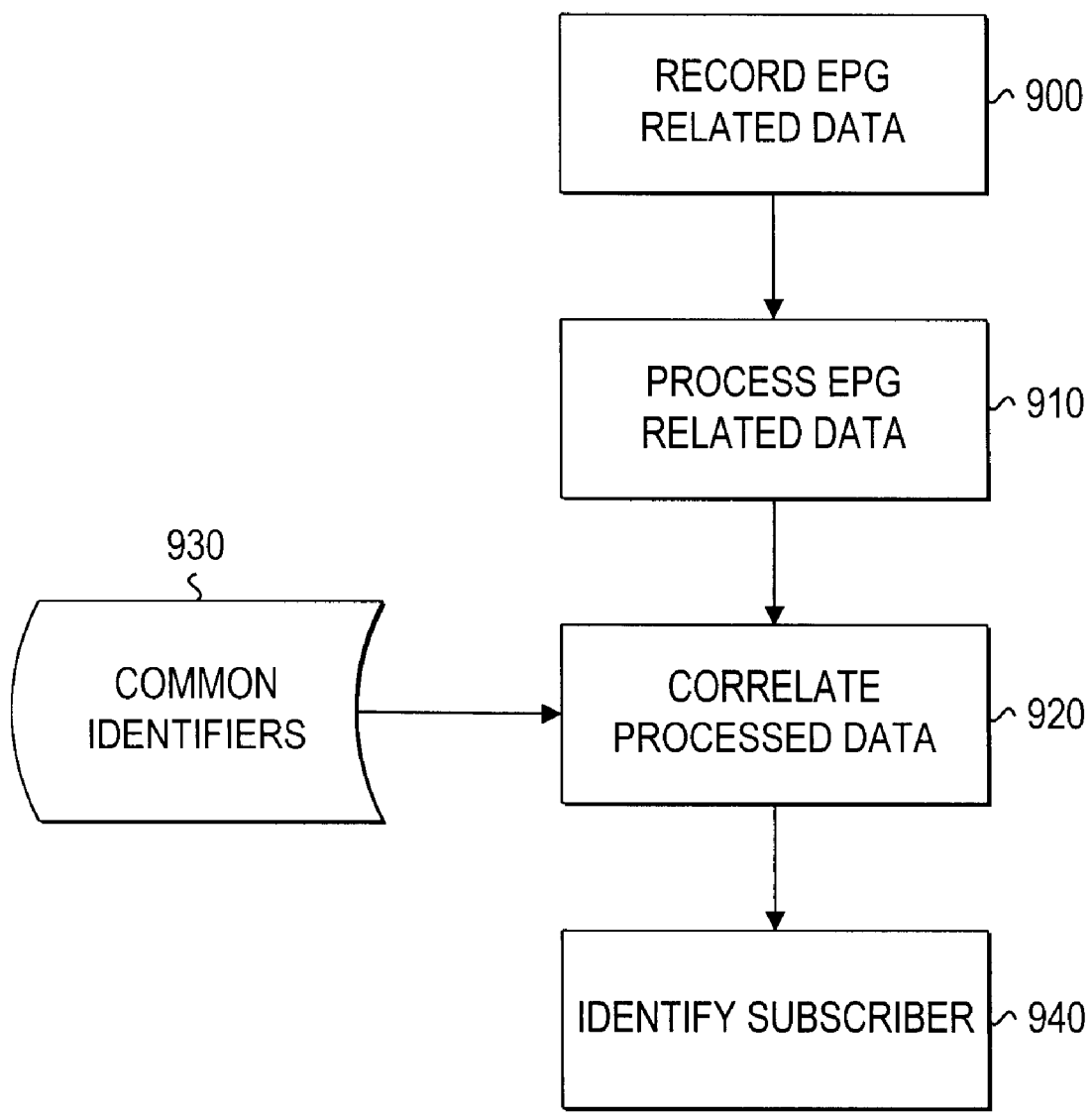
FIG. 9 illustrates a flowchart for identifying a subscriber.

FIG. 9 illustrates a subscriber identification process, wherein the EPG related data 250 is processed and correlated with stored common identifiers 930 to determine the subscriber most likely to be viewing the programming. As illustrated in FIG. 9, the EPG related data 250 is recorded at record step 900. In a preferred embodiment, the EPG related data 250 is the combination of the scrolling speed, the paging speed, the information screen viewing time, and the manner and frequency of EPG activation. Alternatively, the scrolling speed signal, the paging speed signal, the information screen viewing time signal or the manner and frequency of EPG activation control signals is used as the EPG related data. At the process data step 910, a signal processing algorithm can be used to process the EPG related data and obtain a processed version of the EPG related data. In one embodiment, the signal processing algorithm is based on the use of the Fourier transform. In this embodiment, the Fourier transform represents the frequency components of the EPG related data and can be used as a subscriber signature. At the correlate processed data step 920, the processed EPG related data obtained at the process EPG related data step 910 is correlated with the stored common identifiers 930. The stored common identifiers 930 are obtained from the session classification process 700 described in accordance with FIG. 7. The peak correlation value allows the determining of which subscriber is most likely to be viewing the programming. At the identify subscriber step 940, the subscriber producing the EPG related data 250 is then identified among a set of subscribers.

In one embodiment, the system can identify the subscriber after 10 minutes of EPG activity. In this embodiment, a window function length of 10 minutes is first applied to the EPG related data 250 prior to processing by the signal processing algorithm. Similarly, in this embodiment, the stored common identifiers 930 are obtained after applying a window function of the same length to the EPG related data 250. The window function can be a rectangular window, or any other window function that minimizes the distortion introduced by truncating the data. Those skilled in the art can readily identify an appropriate window function.

Alternatively, the identification can be performed after a pre-determined amount of time of EPG activity, in which case the length of the window function is set accordingly.

In the present invention, the learning process or the classification process can be reset to start a new learning or classification process. In one embodiment, using the Fourier transform and correlation to identify the subscriber, a reset function can be applied when the correlation measures between the stored common identifiers 930 and the new processed EPG related data become relatively close.

As previously discussed, identifying an individual subscriber among a set of subscribers, can be thought of as finding a subscriber profile 150 whose common identifier is highly correlated with the processed selection data of the actual viewing session.

FIG. 10 illustrates a pseudo-code that can be used to implement the identification process of the present invention. As illustrated in FIG. 10, the EPG related data 250 of a viewing session is recorded. The EPG related data can be a scrolling speed sequence, a paging speed sequence, an information screen viewing time sequence, a manner of EPG activation sequence, a frequency of EPG activation sequence or the various combinations of the sequences. A Fourier transformation is applied to the sequence to obtain the frequency components of the sequence, which is representative of the profile of the subscriber associated with the viewing session. In a preferred embodiment, the Fourier transform F_T_SEQ is correlated with each of the N common identifiers stored in the system. As illustrated in FIG. 10, the maximum correlation value is determined and its argument is representative of the identifier of the subscriber profile 150.

Although this invention has been illustrated by reference to specific embodiments, it will be apparent to those skilled in the art that various changes and modifications may be made which clearly fall within the scope of the invention. In particular, the examples of a neural network and Fourier transform are not intended as a limitation. Other well known methods can also be used to implement the present invention. A number of neural network, fuzzy logic systems and other equivalent systems can be utilized and are well known to those skilled in the art. Additional examples of such alternate systems for realizing neural network 400 are described in the text entitled "Neural Networks, a Comprehensive Foundation," by Simon Haykin, and in "Understanding Neural Networks and Fuzzy Logic," by Stamatios V. Kartalopoulos, both of which are incorporated herein by reference.

This invention is intended to be protected broadly within the spirit and scope of the appended claims.

What is claimed is:

1. In a telecommunications environment comprising a residential unit for providing a subscriber the ability to select and interact with content, the residential unit including at least a storage medium and a processor, a computer implemented method of associating a subscriber interacting with a device with particular characteristics, the method comprising utilizing the processor to:

monitor subscriber interactions with a device;

process at least a portion of the subscriber interactions to generate a session profile, wherein the session profile is generated without knowledge of the identity of the subscriber and identifies subscriber traits including non-subscriber interaction traits;

compare at least a portion of the session profile with at least a portion of subscriber profiles stored in the storage medium, the subscriber profiles being a compilation of session profiles generated over multiple interaction sessions that have been grouped together based on similarities; and associate, based on similarities between the subscriber profile and the session profile, the subscriber with particular characteristics identified in one of the subscriber profiles.

2. The method of claim 1, wherein the subscriber traits and the particular characteristics include probabilistic demographics.

3. The method of claim 2, wherein said comparing includes comparing at least some subset of the probabilistic demographic characteristics of the subscriber within the session profile with similar attributes in the subscriber profiles.

4. The method of claim 1, wherein the subscriber traits and the particular characteristics include probabilistic program characteristics.

5. The method of claim 4, wherein said comparing includes comparing at least some subset of the probabilistic program characteristics associated with the subscriber within the session profile with similar attributes in the subscriber profiles.

6. The method of claim 1, wherein the session profiles and the subscriber profiles include a subscriber signature.

7. The method of claim 6, wherein the subscriber signature is a discrete spectrum representation of at least same subset of the subscriber interactivity.

8. The method of claim 6, wherein the subscriber signature is a Fourier transform of at least some subset of the subscriber interactivity.

9. The method of claim 6, wherein said comparing includes comparing the subscriber signature within the session profile with similar attributes in the subscriber profiles.

10. The method of claim 1, wherein said comparing is performed by a neural network.

11. The method of claim 1, wherein the session profiles are clustered based on similar subscriber signatures in order to generate the subscriber profiles.

12. The method of claim 1, wherein the session profiles are clustered based on similarities between at least some subset of probabilistic demographic characteristics and probabilistic program characteristics in order to generate the subscriber profiles.

13. The method of claim 1, further comprising retrieving program data associated with content selected within the subscriber interactivity.

14. The method of claim 13, wherein the program data defines at least some subset of program characteristics and program demographics.

15. The method of claim 1, wherein said monitoring includes monitoring electronic program guide interactions.

16. The method of claim 15, wherein the electronic program guide interactions include at least some subset of scrolling speed, paging speed, information screen viewing time, manner of electronic program guide activation, and frequency of electronic program guide activation.

17. A system for associating a subscriber interacting with a device with particular characteristics, the system comprising:

a device;

a storage medium; and a processor for:
monitoring subscriber interactivity with the device;
processing at least a portion of the subscriber interactivity to generate a session profile, wherein the session profile is generated with no knowledge of the identity of the subscriber and identifies subscriber traits including non-subscriber interactivity traits;
comparing at least a portion of the session profile with at least a portion of subscriber profiles, the subscriber profiles being a compilation of session profiles generated over multiple interaction sessions that have been grouped together based on similarities; and
associating, based on similarities between the subscriber profile and the session profile, the subscriber with particular characteristics identified in one of the subscriber profiles.

18. The system of claim 17, wherein said processor generates a session profile that includes probabilistic demographic characteristics and compares at least some subset of the probabilistic demographic characteristics of the subscriber included within the session profile with similar attributes in the subscriber profiles.

19. The system of claim 17, wherein said processor generates a session profile that includes a subscriber signature and compares the subscriber signature included within the session profile with similar attributes in the subscriber profiles.

20. The system of claim 17, wherein said processor monitors subscriber interactions with an electronic program guide.

21. The system of claim 20, wherein said processor monitors at least some subset of scrolling speed, paging speed, information screen viewing time, manner of electronic program guide activation, and frequency of electronic program guide activation.

22. A computer program embodied on a computer-readable medium for associating a subscriber interacting with a device with particular characteristics, said computer program comprising:

a source code segment for monitoring subscriber interactivity;
a source code segment for processing at least a portion of the subscriber interactivity to generate a session profile, wherein the session profile is generated with no knowledge of the identity of the subscriber and identifies subscriber traits and at least some of the subscriber traits are non-subscriber interactivity traits;
a source code segment for comparing at least a portion of the session profile with at least a portion of subscriber profiles, the subscriber profiles being a compilation of session profiles generated over multiple interaction sessions that have been grouped together based on similarities; and
a source code segment for associating, responsive to said source code segment for comparing, the subscriber with particular characteristics identified in one of the subscriber profiles.

23. The computer program of claim 22, wherein said source code segment for monitoring, monitors electronic program guide interactions.

24. The computer program of claim 23, wherein said source code segment for monitoring, monitors at least some subset of scrolling speed, paging speed, information screen viewing time, manner of electronic program guide activation, and frequency of electronic program guide activation.

25. In a television network environment consisting of a display device, a storage medium, and a processor, a computer implemented method for associating a subscriber with particular characteristics, the method comprising:

monitoring subscriber television viewing interactions;
utilizing the processor to process at least a portion of the subscriber television viewing interactions to generate a session profile, wherein the session profile identifies non-television viewing interaction characteristics;
comparing at least a portion of the session profile with at least a portion of subscriber profiles stored in the storage medium, the subscriber profiles being a compilation of session profiles generated over multiple television viewing sessions that have been grouped together based on similarities; and
associating, based on similarities between the subscriber profile and the session profile, the subscriber with particular characteristics identified in one of the subscriber profiles, wherein the identity of the subscriber need not be known in order to associate particular characteristics with the subscriber.

26. The method of claim 25, wherein the particular characteristics include demographic characteristics.

27. The method of claim 25, wherein the particular characteristics are probabilistic.

28. The method of claim 25, wherein the particular characteristics are generated by applying heuristic rules to the subscriber television interactions, wherein the heuristic rules associate the subscriber television interactions to particular characteristics.

29. The method of claim 25, wherein the television viewing interactions include at least some subset of scrolling speed, paging speed, information screen viewing time, manner of electronic program guide activation, and frequency of electronic program guide activation.

* * * * *

UNITED STATES PATENT AND TRADEMARK OFFICE
CERTIFICATE OF CORRECTION

PATENT NO. : 6,714,917 B1  
APPLICATION NO. : 09/635253  
DATED : March 30, 2004  
INVENTOR(S) : Charles A. Eldering et al.

It is certified that error appears in the above-identified patent and that said Letters Patent is hereby corrected as shown below:

Column 4, line 47, delete "contained-in" and replace with --contained in--;

Column 8, line 55, delete "same" and replace with --some--;

Signed and Sealed this

Seventeenth Day of April, 2007

JON W. DUDAS  
*Director of the United States Patent and Trademark Office*